Jan. 3, 1967 W. E. TRAGERT 3,296,030
FUEL CELL WITH STABILIZED ZIRCONIA ELECTROLYTE
AND NICKEL-SILVER ALLOY ANODE
Filed Nov. 1, 1962
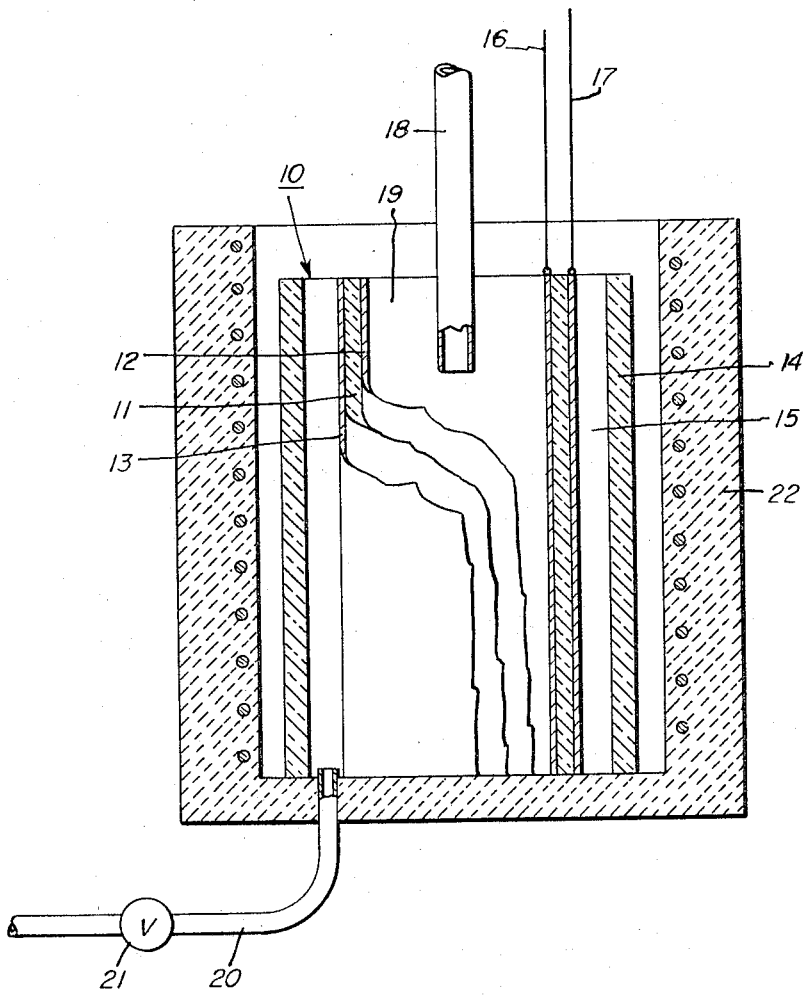
*Inventor:*
William E. Tragert,
by Paul R. Webb, II
*His Attorney.*

United States Patent Office 3,296,030
Patented Jan. 3, 1967

3,296,030
FUEL CELL WITH STABILIZED ZIRCONIA ELECTROLYTE AND NICKEL-SILVER ALLOY ANODE
William E. Tragert, Scotia, N.Y., assignor to General Electric Company, a corporation of New York
Filed Nov. 1, 1962, Ser. No. 234,602
2 Claims. (Cl. 136—86)

This invention relates to high temperature fuel cells employing solid electrolytes and more particularly to such high temperature fuel cells in which the anode electrode comprises a porous alloy matrix of nickel and silver.

In order to avoid inefficiency in electrical energy generation from the heat of chemical reactions, it has been proposed to employ fuel cells to convert the chemical energy of the fuel directly into electrical energy without the conversion of the energy of the fuel into heat and mechanical energy. High temperature fuel cells would be advantageous to provide a low voltage direct current power source on a continuous basis. These cells which are adapted to operate in a temperature range of 1000° C. to 1200° C. would have application in various chemical process industries, such as the manufacture of aluminum and the electro-refining of copper. Furthermore, the operation of direct current motors could be accomplished with these cells. Waste heat can be employed effectively to operate the cells.

In copending application S.N. 92,354, filed February 28, 1961, now Patent 3,138,487, for Fuel Cell, a high temperature fuel cell is disclosed and claimed which comprises a silver cathode, a porous, carbonaceous anode, a solid stabilized zirconia electrolyte positioned between and in direct contact with the electrodes, and means for supplying a gaseous oxidant to the cathode.

In copending application S.N. 92,356, filed February 28, 1961, now abandoned, for Fuel Cell, a high temperature fuel cell is disclosed and claimed which comprises a silver cathode, an anode selected from the group consisting of iron saturated with carbon and cobalt-tin saturated with carbon, a solid stabilized zirconia electrolyte positioned between and in direct contact with the electrodes, means for supplying a gaseous oxidant to the silver cathode, and means for supplying a carbon fuel to the anode. Both of these copending applications are assigned to the same assignee as the present invention.

It would be desirable to provide a high temperature fuel cell which employs hydrogen gas, carbon monoxide gas or mixtures of these gases as the fuel. However, in such a fuel cell, a problem exists in providing a suitable anode electrode which will withstand the elevated operating temperature of the cell and will provide a free flow of fuel and reaction products. The present invention is directed to such an improved fuel cell and anode therefor.

It is an object of my invention to provide a fuel cell with a solid electrolyte which is adapted to operate in a temperature range of 1000° C. to 1200° C.

It is another object of my invention to provide a high temperature fuel cell which employs an anode electrode comprising a porous alloy matrix of nickel and silver.

It is a further object of my invention to provide a high temperature fuel cell which employs a fuel composed of hydrogen, carbon monoxide or mixtures of these gases.

In carrying out my invention in one form, a high temperature fuel cell comprises a solid stabilized zirconia electrolyte, a cathode in direct contact with one surface of said electrolyte, an electrical lead contacting the cathode, means to supply a gaseous oxidant to the cathode, an anode in direct contact with the opposite surface of the electrolyte; the anode comprising a porous alloy matrix of nickel and silver, the nickel being present in an amount by weight of said alloy of from 90% to 99%, and the silver being present in an amount by weight of the alloy of from 1% to 10%; an electrical lead contacting the anode, and means for supplying a fuel selected from the group consisting of hydrogen, carbon monoxide, and mixtures thereof to the anode.

These and various other objects, features, and advantages of the invention will be better understood from the following description taken in connection with the accompanying drawing in which:

The single figure is a sectional view of a high temperature fuel cell embodying my invention.

In the single figure of the drawing, a fuel cell which is adapted to operate in a temperature range of 1000° C. to 1200° C. is shown generally at 10. This cell comprises a solid stabilized zirconia electrolyte 11 in the form of a hollow tubular member, a cathode 12 of a thin film of silver or porous nickel oxide coated on the interior wall of electrolyte 11, an anode 13 in the form of a porous alloy matrix coated on the exterior surface of electrolyte 11, and a tubular member 14 of quartz or other high temperature material positioned around and spaced from anode 13. In this embodiment, the stabilized zirconia electrolyte 11 consists of zirconia to which is added 15 molecular percent calcium oxide. Cathode 12 is composed of a thin film of silver which is characterized by being in liquid state during cell operation. Porous nickel oxide, which is solid during cell operation, can also be employed as cathode 12. Molten silver is applied to the interior surface of electrolyte 11 to provide cathode 12. Porous nickel oxide is produced by applying nickel nitrate to the interior surface of electrolyte 11 which nickel nitrate is subsequently pyrolyzed at 400° C. to 450° C.

Anode 13 comprises a porous alloy matrix of nickel and silver in which the nickel is present in an amount by weight of the alloy of from 90% to 99%, and the silver is present in an amount by weight of the alloy from 1% to 10%. Anode 13 is preferably deposited on the exterior surface of electrolyte 11 by flame spraying an alloy of nickel and silver in the above weight percentages on the exterior surface of the electrolyte. Member 14 defines a fuel gas chamber 15 between the exterior wall of anode 13 and the interior wall of member 14.

A pair of electrical leads 16 and 17 are connected to the respective cathode and anode electrodes of cell 10 and connected at their free ends to apparatus (not shown) being operated by the cell. Means are provided for supplying a gaseous oxidant in the form of air or oxygen to cathode 12. For example, a tube 18 of suitable high temperature material such as zirconia is inserted into a chamber 19 defined by cathode 12 and connected to an oxidant supply (not shown). A fuel gas inlet line 20 with a suitable control valve 21 communicates with chamber 15 and is connected at its opposite ends to a fuel gas supply (not shown). Such a fuel gas comprises hydrogen, carbon monoxide or mixtures of these gases. A resistance furnace 22 is shown enclosing fuel cell 10 to provide an operating temperature of 1000° C. to 1200° C. for the cell. Additionally, the waste heat from the resulting products can be employed to maintain the cell at its desired operating temperature.

I discovered that an efficient, stable fuel cell could be constructed and operated in the temperature range of 1000° C. to 1200° C. to provide a low voltage direct current power source. I found that a preferred cathode was silver or porous nickel oxide to which an oxidant was supplied during cell operation. My development disclosed further that a porous alloy matrix of nickel and silver in which the nickel is present in an amount by weight of the alloy of from 90% to 99% and the silver is present in an amount by weight of the alloy from 1% to 10% provided a suitable anode for the cell. The electrolyte of solid stabilized zirconia comprises a zirconia structure with 15 molecular percent calcium oxide. Other stabilized zirconia, which can also be employed, are discussed in "Oxide Ceramics" by Ryshkewitch, Academic Press, 1960, particularly on pages 354, 364 and 376 thereof. Electrical leads, for example, of platinum are attached to the respective cathode and anode electrodes. The free ends of the leads are connected to apparatus being operated by the cell. A gaseous oxidant in the form of air or oxygen is supplied to the cathode during cell operation. A fuel of hydrogen, carbon monoxide or mixtures of the gases is supplied to the anode. The resulting products of water vapor, carbon dioxide or mixtures of these products are removed from chamber 15 of the cell.

In the operation of fuel cell 10 shown in the figure of the drawing, a fuel gas of hydrogen, carbon monoxide or mixtures of these gases is supplied through fuel gas inlet line 20 into chamber 15. Resistance furnace 22 heats fuel cell 10 to a temperature in the range of 1000° C. to 1200° C. Air is supplied through tube 18 into chamber 19 defined by cathode 12. Cathode 12 becomes molten, but because of its wetting properties, adheres firmly to the interior surface of electrolyte 11. The reaction at the cathode-electrolyte interface is as follows:

(1)  $O + 2e \rightarrow O^=$

The oxygen ion moves through electrolyte 11 to combine with the hydrogen in accordance with the following reaction at the anode-electrolyte interface is as follows:

(2) 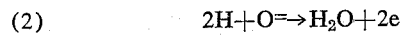 $2H + O^= \rightarrow H_2O + 2e$

The electrons, which are given up at the anode are conducted through lead 17 to the apparatus (not shown) being operated while the oxygen at the cathode combines with the electrons returning through lead 16. The water vapor is discharged from the upper open end of chamber 15. If desired, chamber 15 could terminate in a closed structure from which the waste heat of the resulting product could be extracted for use in maintaining the cell at its operating temperature.

Several examples of fuel cells which are in accordance with the present invention are as follows:

*Example I*

A fuel cell was set up in accordance with FIGURE 1 of the drawing. A solid, stabilized zirconia electrolyte consisting of zirconia to which had been added 15 molecular percent calcium oxide had a silver cathode coated on its interior surface and a porous alloy matrix of nickel and silver flame sprayed on its exterior surface. The nickel was present in an amount by weight of the alloy of 90% and the silver was present in an amount by weight of the alloy of 10%. An electrical lead was connected to each of the electrodes and the power generated by the cell was dissipated in a simple decade resistor. A tubular quartz member was positioned around and spaced from the exterior wall of the anode to provide a gas chamber therebetween. Hydrogen gas was supplied to the fuel gas chamber. Oxygen was supplied to the chamber defined by the cathode. The cell was positioned in a resistance furnace which was heated to 1040° C. The cell was operated for a period of 400 hours during which time the load voltage was .60 volt and the current density was 20 milliamperes per square centimeter.

*Example II*

A fuel cell was set up in accordance with Example I above. Oxygen was supplied to the chamber defined by the cathode while carbon monoxide was supplied as the fuel to the fuel gas chamber. This cell was operated at a temperature of 1020° C. for a period of 2 hours. The load voltage was .70 volt while the current density was 10 milliamperes per square centimeter.

While other modifications of this invention and variations thereof which may be employed within the scope of the invention have not been described, the invention is intended to include such that may be embraced within the following claims.

What I claim as new and desire to secure by Letters Patent of the United States is:

1. A fuel cell comprising a solid stabilized zirconia electrolyte, a cathode in direct contact with one surface of said electrolyte, an electrical lead containing said cathode, means to supply a gaseous oxidant to said cathode, an anode in direct contact with the opposite surface of said electrolyte; said anode comprising a porous alloy matrix of nickel and silver, the nickel being present in an amount by weight of said alloy of from 90% to 99%, and the silver being present in an amount by weight of said alloy of from 1 to 10%; an electrical lead contacting said anode, and means for supplying a fuel selected from the group consisting of hydrogen, carbon monoxide, and mixtures thereof to said anode.

2. A fuel cell comprising a solid stabilized zirconia electrolyte, a cathode in direct contact with one surface of said electrolyte, an electrical lead contacting said cathode, means to supply a gaseous oxidant to said cathode, an anode in direct contact with the opposite surface of said electrolyte; said anode comprising a porous alloy matrix of nickel and silver, the nickel being present in an amount by weight of said alloy of 90% and the silver being present in an amount by weight of said alloy of 10%; an electrical lead contacting said anode, and means for supplying a fuel selected from the group consisting of hydrogen, carbon monoxide, and mixtures thereof to said anode.

References Cited by the Examiner

UNITED STATES PATENTS

| | | | |
|---|---|---|---|
| 2,914,596 | 11/1959 | Gorin et al. | 136—86 |
| 3,020,327 | 2/1962 | Ruetschi | 136—86 |
| 3,042,474 | 7/1962 | Aurand et al. | 75—170 X |
| 3,062,909 | 11/1962 | Reutschi | 136—86 |
| 3,138,490 | 6/1964 | Tragert et al. | 136—86 |
| 3,146,131 | 8/1964 | Linden et al. | 136—86 |

OTHER REFERENCES

Journal Electrochemical Society, vol. 104, June 1957, pages 379–386.

WINSTON A. DOUGLAS, *Primary Examiner.*

JOHN R. SPECK, ALLEN B. CURTIS, H. FEELEY, *Assistant Examiners.*